Jan. 28, 1930. L. A. WISLER 1,744,998
PORTABLE ELECTRIC MOTOR BLOCK WITH SPEED REDUCING DEVICE
Filed July 8, 1927 2 Sheets-Sheet 1

Inventor
L. A. Wisler,
by H. B. Willson & Co
Attorneys

Jan. 28, 1930.  L. A. WISLER  1,744,998
PORTABLE ELECTRIC MOTOR BLOCK WITH SPEED REDUCING DEVICE
Filed July 8, 1927  2 Sheets-Sheet 2
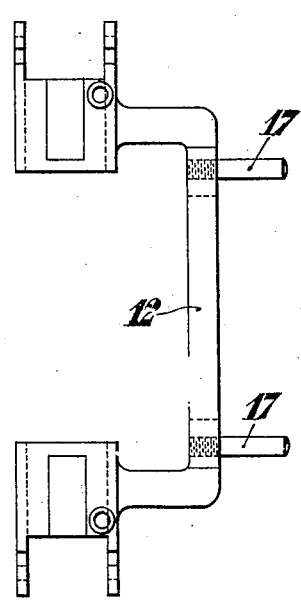
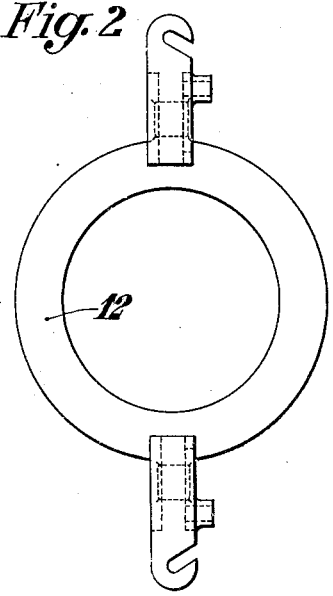
Inventor
L. A. Wisler,
by H. B. Willson & Co.
Attorneys Patented Jan. 28, 1930

1,744,998

UNITED STATES PATENT OFFICE

LOUIS ADOLPHE WISLER, OF PARIS, FRANCE

PORTABLE ELECTRIC-MOTOR BLOCK WITH SPEED-REDUCING DEVICE

Application filed July 8, 1927, Serial No. 204,375, and in France July 17, 1926.

This invention relates to improvements in portable electric motor blocks such as those used for driving various machines in farms, and having an electric motor the speed of which is varied by angularly adjusting the brush-support.

The invention has for object to facilitate the control of such portable electric motor blocks and, to this end, concerns a special switch which permits, by having two essential displacements, of adjusting the brush-support and of closing or opening the feeding circuit of the motor.

On the accompanying drawing, is shown, by way of example only, an electric motor improved according to the invention.

Figs. 2 and 3 are an elevation and a front view respectively, of a rotating brush-support used in connection with the special switch mentioned above.

Figure 1:
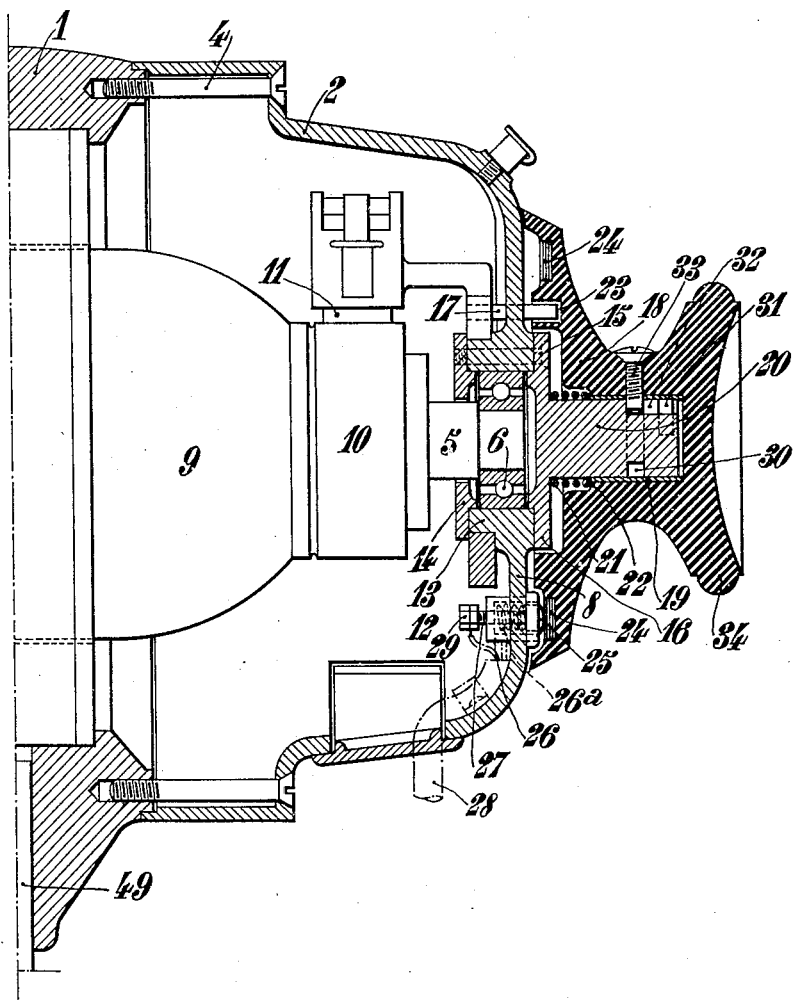
Figure 1 is a vertical axial section of the improved motor.

The motor of the block may be advantageously an electric single-phase-repulsion motor. This motor comprises a frame 1 supporting the inductors and on the two side faces of which fit two casings 2 and 3 which are secured by screws 4, as illustrated, or by any other suitable means.

The shaft 5 of the armature is supported at its ends by ball bearings 6 respectively mounted in a web 7 of the casing 3 and on the bottom 8 of the casing 2. The latter encloses: partly the armature 9, its commutator 10 and the brushes 11 which can be of any suitable arrangement and, for instance, constituted by carbon sticks guided in the end bearing portions of a brush-carrier 12 shown in detail in Figs. 4 and 5. This brush-carrier is provided with a central ring mounted on a bearing portion 13 of the casing 2, so that it can be subjected to angular displacements concentric with the commutator 10. The brush-carrier is laterally held by a base member 14 secured on the casing by suitable means and, for instance, by screws 15 which secure on the same casing an outer base member 16. Two fingers 17 secured on the brush-carrier, parallel to the axis of the angular displacements of the latter, pass through the bottom 8 of the casing 2 in arcuated openings concentric with the armature shaft, so that these fingers can, from the exterior of the casing 2, be actuated for causing the position of the brushes to vary and, consequently, for modifying the working speed of the motor. The displacements of the fingers 17 are obtained by means of a regulator-knob 18 constituting also a switch for placing the motor in or out of circuit. This regulator-knob 18 is constituted by a block of insulating material, such as ebonite for instance it can also be made of metal by insulating the circular copper contact 24. It fits, by a central bore 19, on an axis 20 secured on the base member 16. A spring 21 is interposed between an annular bearing portion 22 of the knob 18 and the base member 16 so as to move the casing 2, in the absence of any external cause, away from the said knob 18. The free end of the fingers 17 enter a notch or perforation 23 of the knob, so as to be angularly rigid with the latter. A ring or crown 24 made of a metal which is preferably a good conductor, and such as copper for instance, is inserted in a groove provided in the inner face of the knob. When the latter is pushed home towards the casing 2 and held in that position, the crown 24 is in contact with two wipers 25 guided in sockets 26 made of insulating material (fiber or the like) and secured on the bottom of the casing 2 in any suitable manner. These wipers 25, subjected to the action of springs 26$^a$, pass through perforations of the casing for fitting against the conducting crown 24 and are connected by their stems 27, one to the current feeding wire, the other to the exciting winding. The two insulated wires of the line: that leading to a wiper and the return wire coming from the exciting winding, are connected under insulating sheath 28 entering the casing 2 through a suitable opening. In Fig. 1, the various connections are not visible, except for one of the wipers, but it will be easily understood that, if the knob 18 is in the postion shown in Fig. 1, the winding of the inductor is in the circuit of the source of current supply. When the knob 18 is sufficiently removed from the casing 2, the wipers 25, held by the nuts 29 acting as abutments, cease to be in contact with the conducting ring 24, the exciting winding is put out of circuit and the operation of the motor is interrupted.

By modifying the position of the brushes 11, the working speed of the motor is regulated and the direction of rotation of the armature can also be reversed. The position of the brushes is modified by angularly displacing the knob 18 which drives with it the brush-carrier 12, through the medium of the fingers 17.

For immobilizing the regulator-knob 18 in running position, or in the stopping position of the motor, use can be made of the following device:

The axis 20 is provided with a peripheral groove 30 and a short circumferential notch 31 connected by an aperture 32 formed according to a generating line. A finger, constituted for instance, by the end of a screw 33 screwed in a radial screw threaded hole of the knob 18, can move in the groove 30 and in the aperture 32. When the fly-wheel 18 is pushed in towards the casing, the finger 33 enters the groove 30 after having moved in the aperture 32. By angularly moving the knob 18, the finger 33 enters the groove 30 and immobilizes the knob which holds the spring 21 under compression. The angular displacements of the knob for the purpose of modifying the position of the brushes, can be effected without the knob abandoning the longitudinal position it occupies in Fig. 1 and which corresponds to the operation of the motor. When the finger 33 is brought opposite the aperture 32, if the knob 18 is released, the spring 21 pushes it back to the end of the aperture 32. A slight angular displacement of the knob causes the finger 30 to enter the short circumferential notch 31 of the axis 20 and the said knob 18 is locked in translation in the stopping position of the motor.

For the purpose of facilitating all the above mentioned operations, the knob 18 can be provided with a handle 34 having a milled periphery, and its outer face can bear any useful indications combined with reference marks traced on the casing 2 in order to indicate the operator the positions of throwing in circuit, of opening of the circuit, of reversal of the direction of running and of acceleration or slowing down of the motor, etc.

What I claim as my invention and desire to secure by Letters Patent is:

1. In an electric motor in which the speed is varied by angularly adjusting the brush-support, a knob axially drilled, a journal on the motor casing for the said knob, and arranged in line with the motor shaft, a circular contact-piece on the knob, concentric with this latter, wipers on the motor casing opposite the said circular contact-piece, fingers on the brush-support passing through arcuated apertures of the motor casing and entering recesses of the knob, a compression spring interposed between the latter and a fixed part of the motor casing, and means to lock the said knob in a longitudinal position for maintaining contact between the wipers and the circular contact-piece.

2. In an electric motor in which the speed is varied by angularly adjusting the brush-support, a knob axially drilled, a journal on the motor casing for the said knob and arranged in line with the motor shaft, a circular contact-piece on the knob concentric with this latter, wipers on the motor casing opposite the said circular contact-piece, fingers on the brush-support passing through arcuated apertures of the motor casing and entering recesses of the knob, a compression spring interposed between the latter and a fixed part of the motor casing, a radial finger provided on the knob and entering grooves of the journal in order to permit of longitudinally immobilizing the said knob on the said journal, by allowing the former to freely rotate.

In testimony whereof I have signed my name to this specification.

LOUIS ADOLPHE WISLER.